US011903492B2

(12) United States Patent
Mao et al.

(10) Patent No.: US 11,903,492 B2
(45) Date of Patent: Feb. 20, 2024

(54) LIGHT-EMITTING SEAT

(71) Applicant: DAKANG HOLDING CO., LTD., Zhejiang (CN)

(72) Inventors: Rujia Mao, Zhejiang (CN); Xiaoyu He, Zhejiang (CN); Guofei Yuan, Zhejiang (CN); Haitao Ouyang, Zhejiang (CN)

(73) Assignee: DAKANG HOLDING CO., LTD., Zhejiang (CN)

( * ) Notice: Subject to any disclaimer, the term of this patent is extended or adjusted under 35 U.S.C. 154(b) by 335 days.

(21) Appl. No.: 17/421,386

(22) PCT Filed: Jan. 2, 2020

(86) PCT No.: PCT/CN2020/070065

§ 371 (c)(1), (2) Date: Jul. 8, 2021

(87) PCT Pub. No.: WO2021/103282

PCT Pub. Date: Jun. 3, 2021

(65) Prior Publication Data

US 2022/0087433 A1 Mar. 24, 2022

(30) Foreign Application Priority Data

Nov. 28, 2019 (CN) ......................... 201922098573.3

(51) Int. Cl.

*A47C 7/72* (2006.01)
*F21S 4/28* (2016.01)
(Continued)

(52) U.S. Cl.

CPC ................ *A47C 7/725* (2013.01); *F21S 4/28* (2016.01); *F21V 3/00* (2013.01); *F21V 23/02* (2013.01)

(58) Field of Classification Search

CPC .. A47C 7/725; A47C 7/72; A47C 1/00; A47C 7/282; A47C 7/22; A47C 7/285; F21S 4/28

See application file for complete search history.

(56) References Cited

U.S. PATENT DOCUMENTS 3,258,259 A * 6/1966 Bohlin ..................... A47C 7/22 267/89
5,544,943 A * 8/1996 Durling .................... A47C 7/22 297/452.64
(Continued)

FOREIGN PATENT DOCUMENTS

CN 108652308 10/2018
CN 208827673 5/2019
(Continued)

OTHER PUBLICATIONS

"International Search Report (Form PCT/ISA/210) of PCT/CN2020/070065," dated Aug. 20, 2020, with English translation thereof, pp. 1-5.

*Primary Examiner* — Milton Nelson, Jr.
(74) *Attorney, Agent, or Firm* — JCIP GLOBAL INC.

(57) ABSTRACT

A light-emitting seat includes a seat body, a strip light module, a skin layer, and a power supply assembly. The seat body includes a chair frame and a plurality of bandages disposed on the chair frame. The strip light module includes a strip light and a light guide material layer covering the strip light, and the strip light module is disposed on the bandages. The skin layer covers the seat body (1) and the strip light module, and at least an area of the skin layer covering the strip light module is made of light-transmitting material. The power supply assembly is electrically connected to the strip light to supply energy. In the invention, the strip light is
(Continued)

covered by the light guide material layer, so the light is refracted in the light guide material layer.

10 Claims, 2 Drawing Sheets

(51) Int. Cl.
*F21V 3/00* (2015.01)
*F21V 23/02* (2006.01)

(56) References Cited

U.S. PATENT DOCUMENTS

| | | | | | |
|---|---|---|---|---|---|
| 6,126,233 | A | * | 10/2000 | Gaetano | B60N 2/286<br>297/217.6 |
| 6,854,869 | B1 | * | 2/2005 | Fernandez | B60Q 3/80<br>297/184.17 |
| 9,802,535 | B2 | * | 10/2017 | Line | B60N 2/70 |
| 2016/0052447 | A1 | * | 2/2016 | Salter | B60Q 9/00<br>297/217.6 |
| 2019/0328142 | A1 | | 10/2019 | Ma | |

FOREIGN PATENT DOCUMENTS

| | | |
|---|---|---|
| CN | 208972995 | 6/2019 |
| CN | 110432680 | 11/2019 |

* cited by examiner

LIGHT-EMITTING SEAT

CROSS-REFERENCE TO RELATED APPLICATION

This application is a 371 of international application of PCT application serial no. PCT/CN2020/070065, filed on Jan. 2, 2020, which claims the priority benefit of China application no. 201922098573.3 filed on Nov. 28, 2019. The entirety of each of the above mentioned patent applications is hereby incorporated by reference herein and made a part of this specification.

BACKGROUND

Technical Field

The invention relates to a seat, and in particular, to a light-emitting seat for creating atmosphere.

Description of Related Art

With the vigorous development of the e-sports industry, various peripheral products related to e-sports emerge in large quantities. To pursue great game experience, professional e-sports players and most game players particularly demand the atmosphere and visual effects of entire games. With such demand, e-sports chairs came into being.

In addition to the pursuit of ultimate performance, those various e-sports related products launched on the market have a certain pursuit of cool and dazzling appearance. The disclosed patent with publication number CN108652308A discloses a seat with side strip lights, including a seat body and a side strip light module. The side strip lights are disposed along the outer edge curve of the cushion portion of the seat body or the outer edge curve of the seat body, and the visual effect of the gaming chair is enhanced through the light emission of the side strip light module, thereby satisfying the pursuit of cool and dazzling effects of the users. However, direct light emission through the side strip lights may fail to produce soft light, cause less visual comfort due to chronic exposure, and have poor visual effects, so the overall gaming chair appears not to be high-end. In addition, currently the light-emitting seats all require the installation of side strip lights on the finished chairs, which consumes a lot of manpower to install the side strip lights on each light-emitting seat and causes low production efficiency.

SUMMARY

In view of the defects and problems in the related art, the invention provides a light-emitting seat, including:

- a seat body, including a seat frame, a plurality of bandages, wherein the bandages are disposed on the seat frame;
- a strip light module, including a strip light and a light guide material layer, wherein the light guide material layer covers the strip light, and light is refracted by the light guide material layer to form soft light, the strip light module is disposed on the bandages, the light guide material layer can only cover the area of the strip light or can cover the entire seat body disposed with strip light, so that both the functions of light guiding and soft package are achieved; and
- a skin layer, covering the seat body and the strip light module, wherein at least an area of the skin layer covering the strip light module is made of light-transmitting material, the light-transmitting material is transparent or semi-transparent, so that light emitted by the strip light module can be displayed on a surface of the seat; and
- a power supply assembly, electrically connected to the strip light to supply energy.

Preferably, the seat body further includes a soft filling layer disposed between the skin layer and the seat body. The soft filling layer is disposed away from the light guild material layer and has function of soft package.

Preferably, the soft filling layer and the light guide material layer are integrally formed. The material for integral formation is a material having functions of light guiding and soft package or two stitched materials respectively having functions of light guiding and soft package.

Preferably, the chair frame includes a seat frame and a backrest frame. The strip light can be either disposed on both the seat frame and the backrest frame or on one of the seat frame and backrest frame.

Preferably, multiple bandages are disposed parallel to one another on two vertical sides of the seat frame and two vertical sides of the backrest frame. The bandages are disposed parallel to the two vertical sides of the backrest frame. The strip light is disposed on each bandage or between different bandages.

Preferably, the bandages are disposed and crisscrossed on the seat frame and the backrest frame horizontally and vertically. The strip light is disposed in any shape to meet the needs of different users.

Preferably, the strip lights are selected from one or more of RGB light strips and LED light strips.

Preferably, the light guide material layer is selected from one or more of foams, EVA, and EPE.

Preferably, the soft filling layer is selected from one or more of foams, EVA foams, and EPE foams.

Preferably, the light-transmitting material is selected from one or more of mesh cloth, silica gel, and transparent plastic.

Preferably, the light-emitting seat further includes a control panel capable of receiving a signal to control a color and a sequence of light emitted by the strip light.

Preferably, the strip light can emit at least two colors of light, so that the entire light-emitting seat can be more colorful to meet the needs of the different users.

Preferably, the light guide material layer has various colors and may have combinations of color light when combined with the strip light to meet the needs of different users.

In the invention, the strip light is covered by the light guide material layer, so light is refracted in the light guide material layer, the light-emitting seat has soft light, great visual comfort, good visual effects, and the seat appears to be high-end. Compared to the strip light module disposed on the chair frame, the strip light module disposed on the bandages contributes to an effect that the strip light module can be disposed on the bandages at will, leading to more design freedom, and as the bandages are flexible, the user experience can be enhanced because the light alternately dims and brightens when a human being sits in the front of the back of the seat.

DESCRIPTION OF THE EMBODIMENTS

The invention is further described below in accordance with the embodiments and the drawings.

Figure 1:
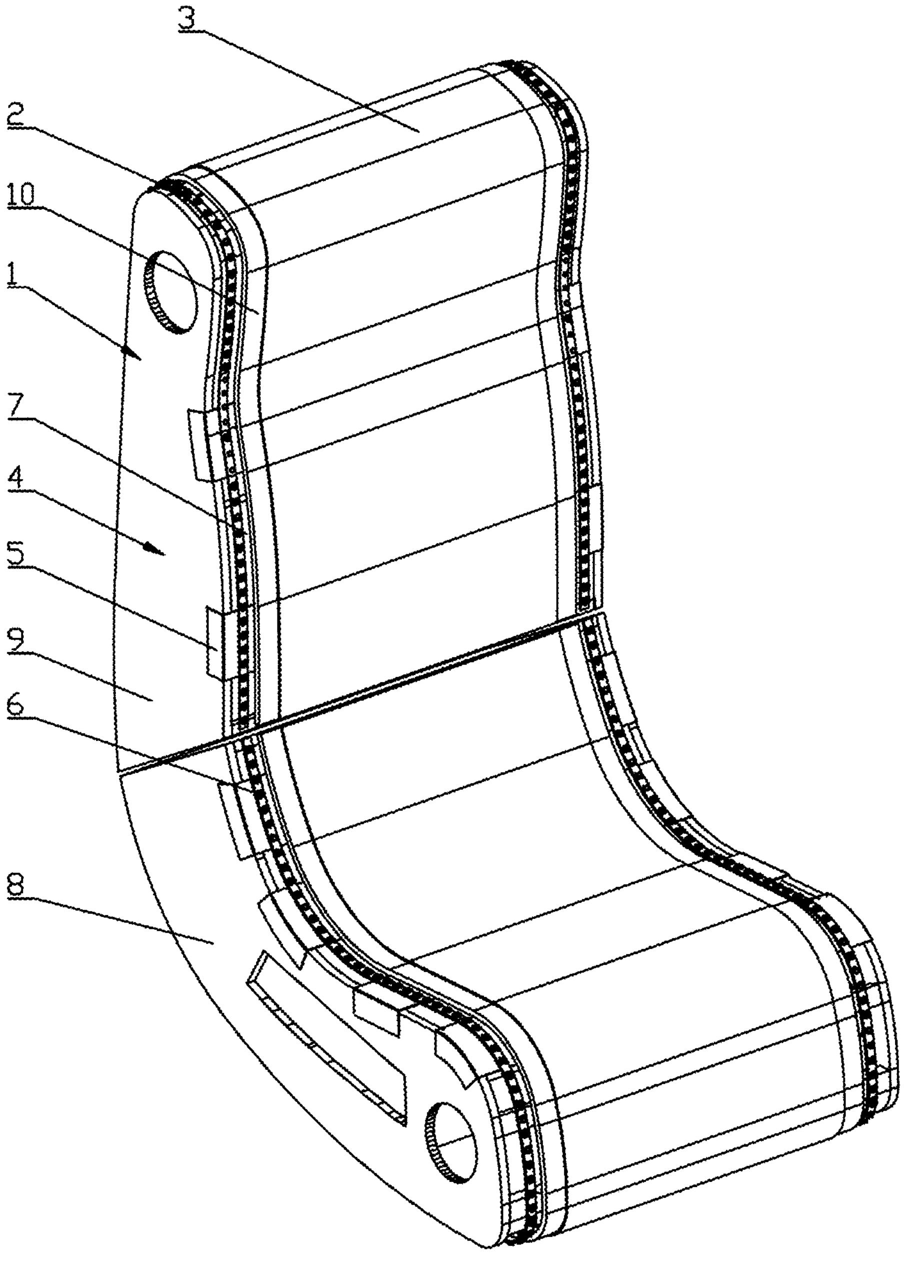
FIG. 1 illustrates a light-emitting seat according to an embodiment of the invention.
Figure 3:
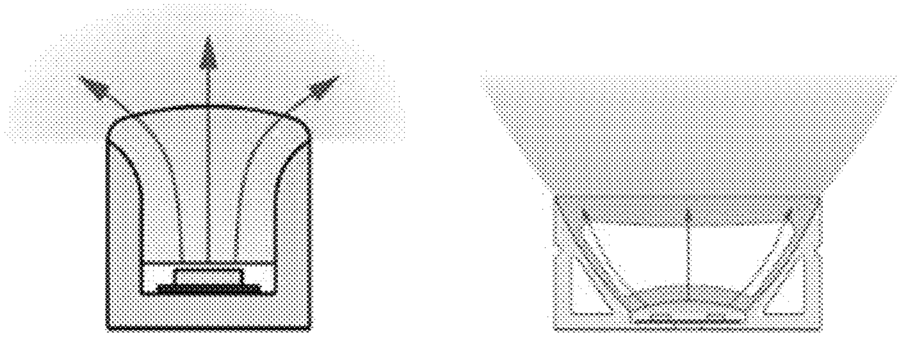
FIG. 3 illustrates a contrast between light of the strip light and light of the strip light covered the light guide material layer.

With reference to FIG. 1, a light-emitting rocking seat according to an embodiment of the invention is illustrated in the following paragraphs. The light-emitting seat includes a seat body 1, a strip light module 2, a skin layer 3, and a power supply assembly. The seat body 1 includes a chair frame 4, a plurality of bandages 5, and a soft filling layer 10. The bandages 5 are disposed on the chair frame 4, and the soft filling layer 10 is disposed between the skin layer 3 and the seat body 1. Moreover, the strip light module 2 includes a strip light 6 and a light guide material layer 7. The back surface of the strip light 6 is fixed on the bandages 5 in an adhesive manner, and the light guide material layer 7 covers the strip light 6 and is bonded by an adhesive. The light guide material layer 7 and the soft filling layer 10 are integrally formed as one piece. The material for integral formation has functions of both light guiding and soft package. As shown in FIG. 3, the light is refracted through the light guide material layer 7 to form soft light, the skin layer 3 covers the seat body 1 and the strip light module 2, and the skin layer 3 has at least an area covering the strip light module 2 and made of light-transmitting material. The power supply assembly is electrically connected to the strip light 6 to supply energy. The power supply assembly can be a power cord connected to a power source or an assembly that can independently provide energy, and the power supply assembly usually adopts lithium batteries since the assembly is usually used in movable furniture. Since the strip light 6 is flexible, the strip light 6 can be disposed on the bandages in any various shapes to meet the needs of different users. The light guide material layer 7 refracts the light to form soft light, so the entire seat comes with aesthetic appearance. When the distance between the strip light 6 and the light guide material layer 7 is greater than 15 mm, the soft light effect is more significant.

Figure 2:
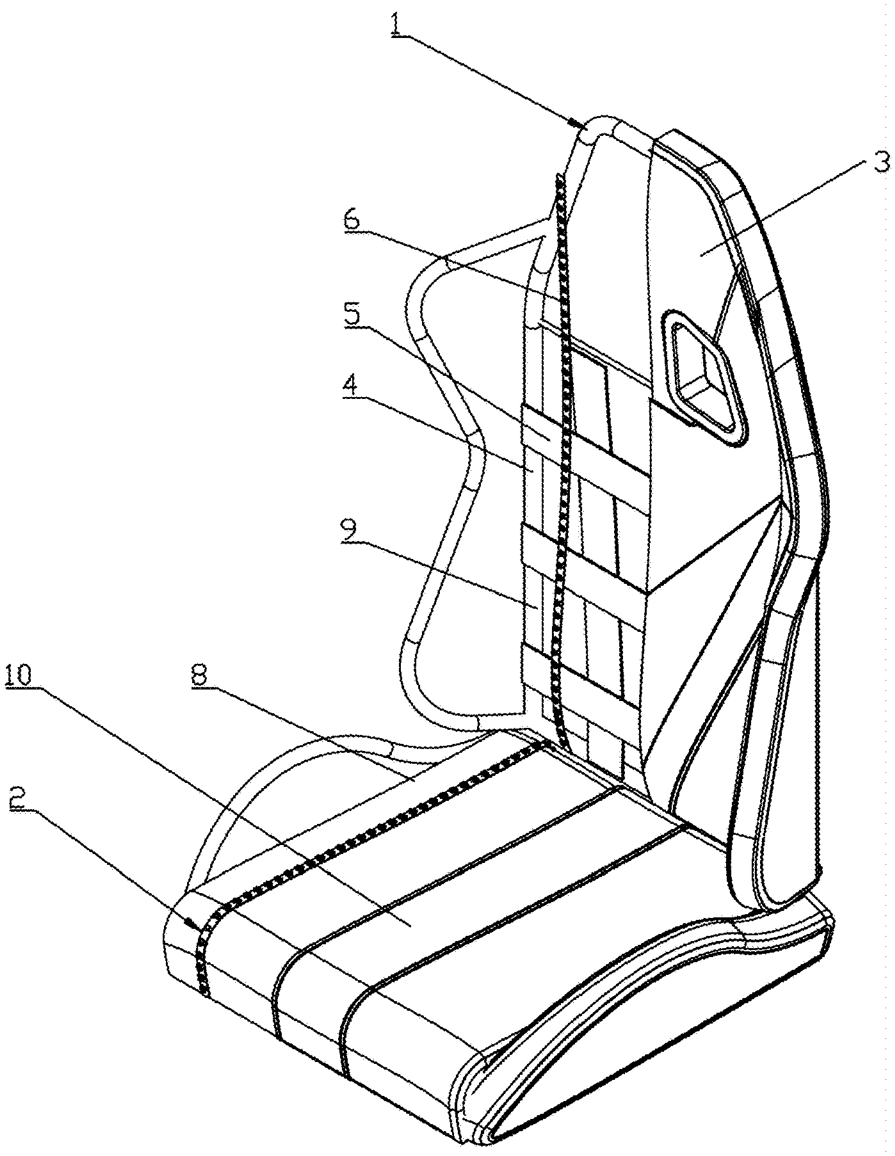
FIG. 2 illustrates a light-emitting seat according to another embodiment of the invention.

With reference to FIG. 2, a light-emitting gaming seat according to an embodiment of the invention is illustrated in the following paragraphs. The light-emitting seat includes a seat body 1, a strip light module 2, a skin layer 3, and a power supply assembly. The seat body 1 includes a chair frame 4, a plurality of bandages 5, and a soft filling layer 10. The bandages 5 are disposed on the chair frame 4, and the soft filling layer 10 is disposed between the skin layer 3 and the seat body 1. The strip light module 2 includes a strip light 6 and a light guide material layer 7. The back surface of the strip light 6 is fixed on the bandages 5 in an adhesive manner, and the light guide material layer covers the strip light 6 and is bonded by an adhesive. The light guide material layer and the soft filling layer 10 are integrally formed as one piece. The material for integral formation has functions of both light guiding and soft package. As shown in FIG. 3, the light is refracted through the light guide material layer 7 to form soft light, the skin layer 3 covers the outside of the seat body 1 and the strip light module 2, and the at least area of the skin layer covering the strip light module 2 is made of light-transmitting material. The power supply assembly is electrically connected to the strip light 6 to supply energy. The power supply assembly can be a power cord connected to a power source or an assembly that can independently provide energy, and the power supply assembly usually adopts lithium batteries since the assembly is usually used in movable furniture. Since the strip light 6 is flexible, the strip light 6 can be disposed on the bandages in any various shapes to meet the needs of different users. The light guide material layer 7 refracts the light to form soft light, so the entire seat comes with aesthetic appearance. When the distance between the strip light 6 and the light guide material layer is greater than 15 mm, the soft light effect is more significant.

The invention is further described below in accordance with the embodiments and the drawings.

As shown in FIG. 1 and FIG. 2, the chair frame includes a seat frame 8 and a backrest frame 9. Multiple bandages are disposed parallel to one another on two vertical sides of the backrest frame 9. The seat frame 8 includes two bandages disposed and crisscrossed in the middle part. The strip light 6 can be disposed on the backside and the seat surface of the seat in any shape to meet the needs of different users.

The strip light 6 can emit at least two colors of light, and the light guide material layer 7 has various colors and may have combinations of color light when combined with the strip light 6. Moreover, the entire strip light module 2 can control the color and the sequence of the light emitted in each area and whether to emit light or not, through the control panel, to meet the needs of different users.

The strip light 6 is an RGB light strip or an LED light strip, and the light guide material layer 7 is foams, EVA, or EPE, and the light-transmitting material is mesh cloth, silica gel, and transparent plastic.

In the above embodiments, only several implementation modes of the invention are illustrated, the description is relatively specific and detailed, but note that the description is not intended to limit the patent scope of the invention. It should be pointed out that for those of ordinary skill in the art, without departing from the concept of the invention, several modifications and improvements can be made, and these all fall within the protection scope of the invention. Therefore, the protection scope of the patent of the invention should be subject to the appended claims.

What is claimed is:

1. A light-emitting seat, comprising:

a seat body, including a chair frame and a plurality of bandages, wherein the bandages are disposed on the chair frame;

a strip light module, including a strip light and a light guide material layer, wherein the light guide material layer covers the strip light, and the strip light module is disposed on the bandages;

a skin layer, covering the seat body and the strip light module, wherein at least an area covering the strip light module is a light-transmitting material; and a power supply assembly, electrically connected to the strip light.

2. The light-emitting chair according to claim 1, further comprising a soft filling layer disposed between the skin layer and the seat body.

3. The light-emitting seat according to claim 2, wherein the soft filling layer and the light guide material layer are integrally formed.

4. The light-emitting chair according to claim 1, wherein the chair frame comprises a seat frame and a backrest frame.

5. The light-emitting chair according to claim 4, wherein the bandages are disposed parallel to one another on two vertical sides of the seat frame and two vertical sides of the backrest frame.

6. The light-emitting chair according to claim 4, wherein the bandages are horizontally and vertically disposed on the seat frame and the backrest frame, and the bandages are crisscrossed.

7. The light-emitting chair according to claim 1, wherein the strip light is selected from one or more of RGB light strips and LED light strips.

8. The light-emitting chair according to claim 1, wherein the light guide material layer is selected from one or more of foams, Ethylene Vinyl Acetate (EVA), and expanded polyethylene (EPE).

9. The light-emitting chair according to claim 1, wherein the light-transmitting material is selected from one or more of mesh cloth, silica gel, and transparent plastic.

10. The light-emitting seat according to claim 1, wherein the light-emitting seat further comprises a control panel capable of receiving a signal to control a color and a sequence of light emitted by the strip light.

* * * * *